(12) United States Patent
Ahmed et al.

(10) Patent No.: US 7,874,393 B2
(45) Date of Patent: Jan. 25, 2011

(54) THEFT DETERRENT SHIELD FOR ELECTRONIC DEVICE

(75) Inventors: Golam Ahmed, Marysville, OH (US); Jack Alan Strahm, Jr., Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 12/132,201

(22) Filed: Jun. 3, 2008

(65) Prior Publication Data

US 2009/0294198 A1 Dec. 3, 2009

(51) Int. Cl.
*B60B 7/16* (2006.01)
(52) U.S. Cl. .................... 180/287; 340/426.34; 439/297
(58) Field of Classification Search .................. 180/287; 340/426.34, 426.1; 439/297, 284, 567; 455/345; 248/551, 27.1; 70/58
See application file for complete search history.

(56) References Cited

U.S. PATENT DOCUMENTS

| | | | |
|---|---|---|---|
| 4,726,789 A * | 2/1988 | Yaffe | 439/567 |
| 4,759,424 A | 7/1988 | Rolleri | |
| 5,295,375 A | 3/1994 | Jonas | |
| 5,441,421 A * | 8/1995 | Ponticelli et al. | 439/284 |
| 5,705,975 A | 1/1998 | Serino et al. | |
| 6,005,301 A * | 12/1999 | Sova et al. | 307/10.2 |
| 6,171,142 B1 * | 1/2001 | Wang et al. | 439/567 |
| 6,628,523 B2 | 9/2003 | Abkowitz et al. | |
| 6,741,166 B1 | 5/2004 | Sanchez | |
| 7,283,357 B2 * | 10/2007 | Kim | 361/679.41 |
| 7,583,495 B2 * | 9/2009 | Carnevali | 361/679.29 |

FOREIGN PATENT DOCUMENTS

JP 2007-056908 3/2007

* cited by examiner

*Primary Examiner*—Paul N Dickson
*Assistant Examiner*—Karen Jane J Amores
(74) *Attorney, Agent, or Firm*—Plumsea Law Group, LLC

(57) ABSTRACT

A theft deterrent system for an electronic device associated with a motor vehicle is disclosed. The theft deterrent system includes a shield portion, a bracket portion and a fastener. The shield portion and the bracket portion are attached to an electronic device with the fastener. The shield portion prevents substantially immediate removal of a connector from a connecting port of the electronic device.

20 Claims, 7 Drawing Sheets

THEFT DETERRENT SHIELD FOR ELECTRONIC DEVICE

BACKGROUND OF THE INVENTION

1. Field of the Invention

The present invention relates generally to motor vehicles and in particular to a theft deterrent system for an electronic device.

2. Description of Related Art

Theft deterrent systems for a motor vehicle have been previously proposed. Some motor vehicles incorporate a security system that prevents a would be thief from stealing a motor vehicle. Some security systems are connected to an electronic control unit (ECU) of the motor vehicle. In order to bypass these security systems, a thief may attempt to access the ECU directly. There is a need in the art for a system that helps deter would be thieves from accessing the electronic control unit.

SUMMARY OF THE INVENTION

A theft deterrent system for an electronic device is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a motor vehicle, comprising: an ECU including an ECU connecting port; a connector configured to connect with the ECU connecting port, the connector providing access to one or more electrical systems of the motor vehicle; a bracket portion attached to the ECU including a first fastener receiving portion; a shield portion including a second fastener receiving portion; a fastener configured to engage the first fastener receiving portion and the second fastener receiving portion and thereby attach the shield portion to the bracket portion; and where the shield portion is configured to cover a portion of the connector to prevent substantially immediate removal of the connector from the ECU connecting port.

In another aspect, the ECU includes a plurality of ECU connecting ports corresponding with a plurality of connectors.

In another aspect, the shield portion is configured to cover a portion of the plurality of connectors.

In another aspect, the fastener is a bolt.

In another aspect, the shield portion can be moved by unscrewing the bolt to allow access to the connector.

In another aspect, the bolt has a first length that is substantially similar to a second length of a guide wall of the shield portion.

In another aspect, the shield portion is attached to the bracket portion using at least two fasteners.

In another aspect, the invention provides a motor vehicle, comprising: an ECU including an ECU connecting port; a connector configured to connect with the ECU connecting port, the connector providing access to one or more electrical systems of the motor vehicle; a bracket portion attached to the ECU including a first fastener receiving portion; a shield portion including a second fastener receiving portion; a fastener configured to engage with the first fastener receiving portion and the second fastener receiving portion and thereby attach the shield portion to the bracket portion; the shield portion further including a guide wall; the bracket portion further including a guide tab; the shield portion being configured cover a portion of the connector to prevent substantially immediate removal of the connector from the ECU connecting port; and where the shield portion is configured to move in a first direction that is substantially parallel with the length of the shield portion and wherein the guide wall is configured to substantially prevent rotation of the shield portion about the first direction.

In another aspect, the fastener is a bolt.

In another aspect, the guide wall has a second length that is substantially similar to a first length of the bolt.

In another aspect, the fastener is completely unfastened to remove the shield portion.

In another aspect, the guide wall extends over a majority of the length of the shield portion.

In another aspect, the ECU is associated with a brace.

In another aspect, the guide wall is disposed between the brace and the guide tab.

In another aspect, the connector includes a connector lever.

In another aspect, the connector lever is raised to allow the connector to be removed from the ECU connecting port.

In another aspect, a first portion of the shield portion is disposed adjacent to the connector lever and prevents removal of the connector when the shield portion is in a fastened position.

In another aspect, the invention provides a method of preventing substantially immediate removal of a connector from an ECU connecting port of a motor vehicle, comprising the steps of: associating a shield portion with a bracket portion of the ECU; aligning the shield portion to prevent removal of the connector from the ECU connecting port; fastening the shield portion to the bracket portion with a fastener; and thereby increasing the time required to remove the connector from the ECU connecting port.

In another aspect, the step of fastening the shield portion to the bracket portion includes a step of screwing a bolt through the bracket portion and the shield portion.

In another aspect, the step of aligning the shield portion includes a step of associating a guide wall of the shield portion with a guide tab of the bracket portion.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
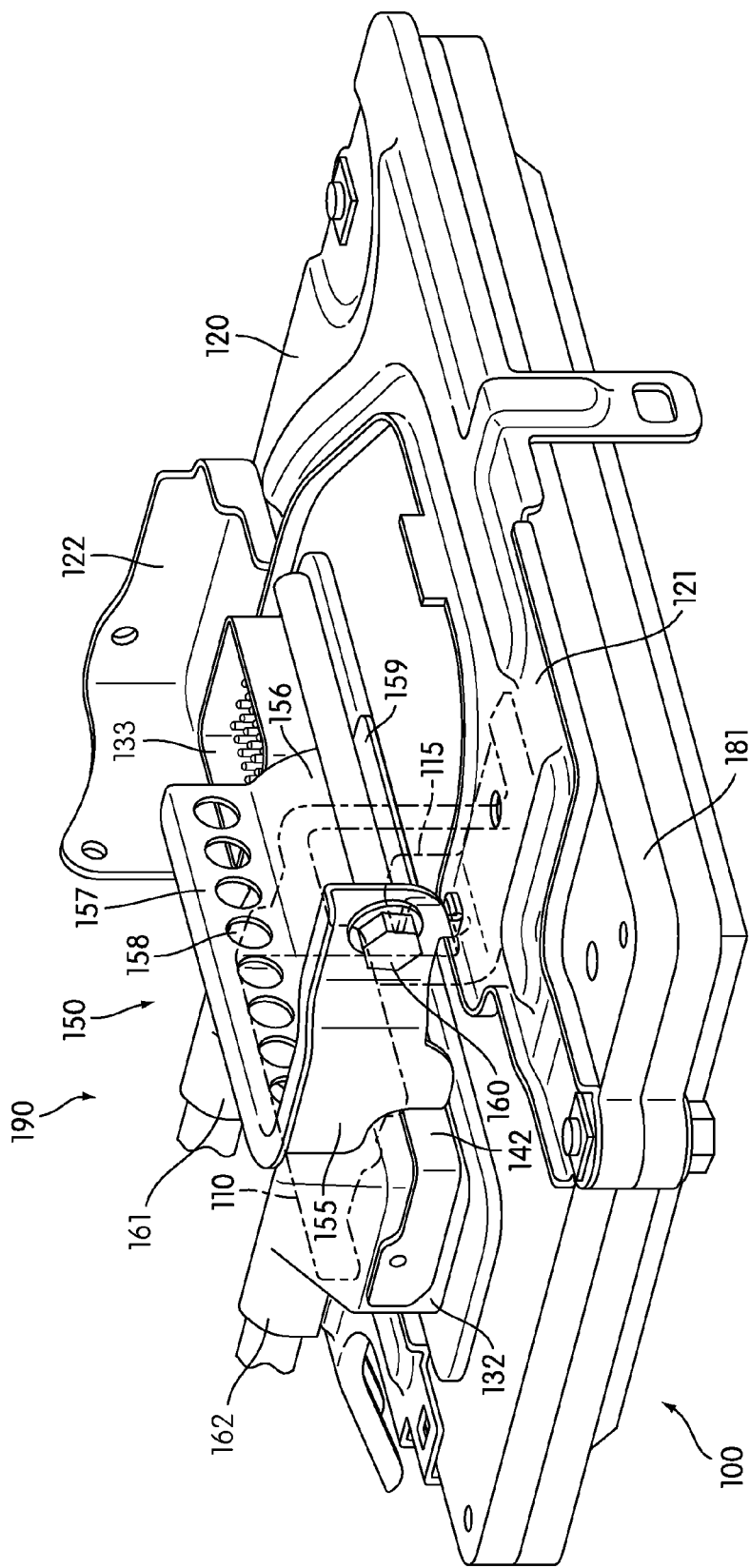
FIG. 1 is an assembled isometric view of a preferred embodiment of an electronic control unit with a theft deterrent system.
Figure 2:
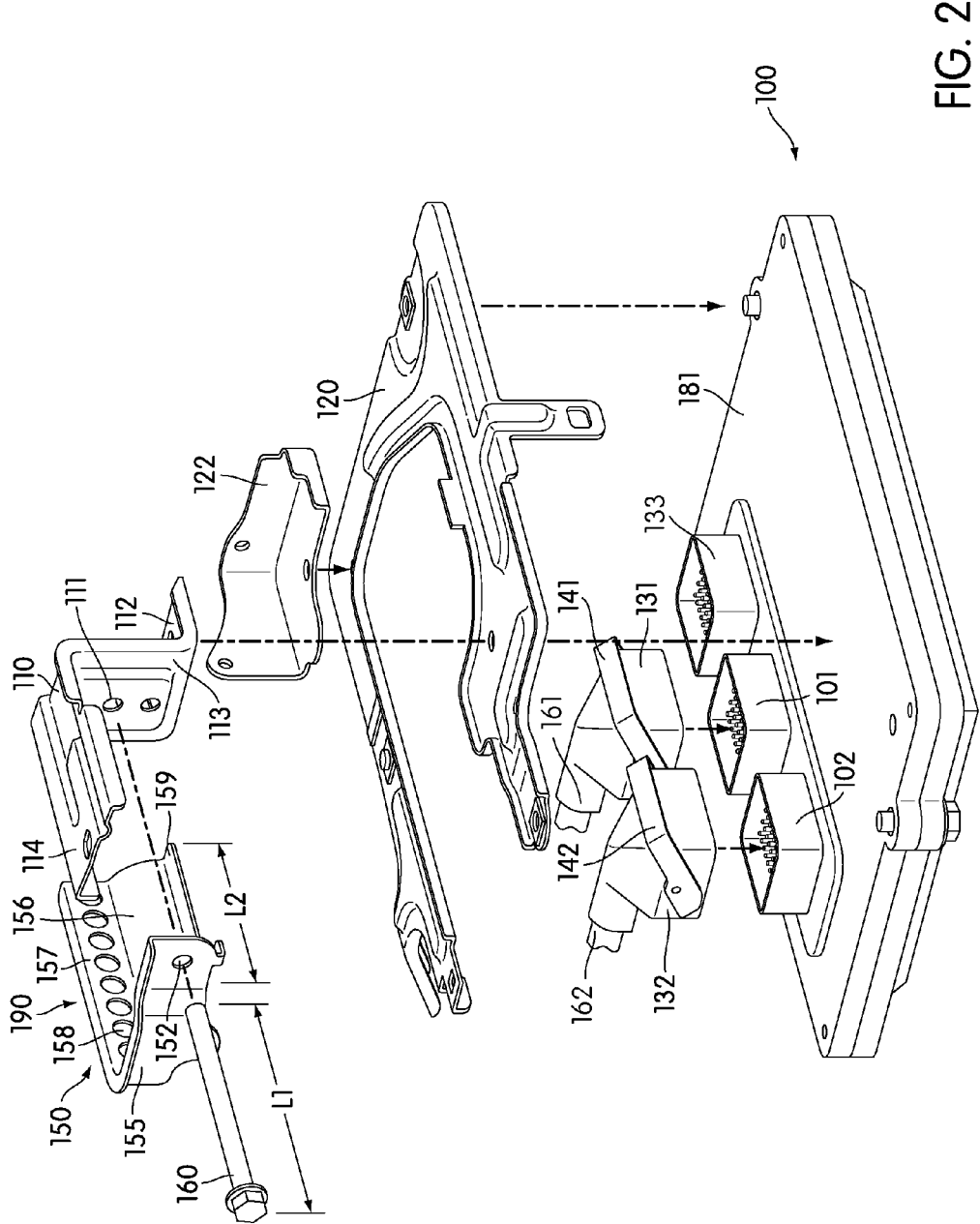
FIG. 2 is an exploded isometric view of a preferred embodiment of an electronic control unit with a theft deterrent system.

FIG. 1 is an assembled isometric view of a preferred embodiment of theft deterrent system 190 for electronic control unit 100, also referred to as ECU 100. FIG. 2 is an exploded isometric view of a preferred embodiment of theft deterrent system 190 for ECU 100. Referring to FIGS. 1 and 2, ECU 100 is preferably associated with a motor vehicle of some kind. Generally, ECU 100 may be installed in any type of motor vehicle including, but not limited to cars, trucks, vans, minivans, SUV's, motorcycles, scooters, boats, personal watercraft, and aircraft. Furthermore, ECU 100 may be installed in any location of a motor vehicle including, but not limited to an engine compartment, behind a dashboard or a control panel of the motor vehicle. Also, it should be understood that ECU 100 may be oriented in any direction in other embodiments.

Generally, ECU 100 may be a computer or electronic device of some kind. In some embodiments, ECU 100 could be part of an onboard computer of the motor vehicle that is configured to control various systems. In some cases, ECU 100 may be an engine control unit that controls various operations of an engine and a motor vehicle. In other embodiments, ECU 100 may be another type of electronic device associated with a motor vehicle.

Although the preferred embodiment of theft deterrent system 190 is installed in ECU 100 of a motor vehicle, it should be understood that in other embodiments, theft deterrent system 190 could be used with other electronic devices. Generally, theft deterrent system 190 could be used to deter access to any type of electronic device. Examples of other types of electronic devices include, but are not limited to audio devices, video devices, computers, navigational systems, as well as other types of electronic devices.

Preferably, ECU 100 is associated with one or more components that assist in the installation of ECU 100 in a motor vehicle. In some embodiments, ECU 100 may be associated with brace 120. Referring to FIG. 2, brace 120 can be attached to first side 181 of ECU 100. However, in other embodiments, brace 120 may attached to another portion of ECU 100. In this embodiment, brace 120 covers a substantial portion of first side 181 and protrudes outward from ECU 100 to mount ECU 100 to a portion of a motor vehicle, as illustrated in FIG. 1.

ECU 100 also includes bracket portion 110 to mount ECU 100 to a portion of a motor vehicle. Referring to FIG. 1, bracket portion 110 is illustrated in phantom for purposes of illustration. Preferably, bracket portion 110 is also associated with first side 181 of ECU 100. Bracket portion 110 preferably includes first portion 112 and second portion 114, as illustrated in FIG. 2. Bracket portion 110 also preferably includes intermediate portion 113 that is disposed between first portion 112 and second portion 114. Preferably, first portion 112 of bracket portion 110 is generally flat. Likewise, second portion 114 is also generally flat. Finally, intermediate portion 113 may extend in a generally perpendicular direction to first portion 112 and second portion 114.

In some embodiments, first portion 112 of bracket portion 110 may be configured to fasten to brace 120 disposed on first side 181 of ECU 100. Similarly, second portion 114 can be configured with provisions to fasten to a portion of a motor vehicle. With this arrangement, bracket portion 110 can assist in mounting ECU 100 to a motor vehicle. In other embodiments, bracket portion 110 may be configured in another manner to mount ECU 100 to a portion of a motor vehicle.

In some embodiments, ECU 100 can include additional components to incorporate ECU 100 within a motor vehicle. In this embodiment, ECU 100 is configured with corner portion 122. Corner portion 122 is disposed on first side 181. In a preferred embodiment, corner portion 122 can facilitate attachment of ECU 100 to a body or chassis of the motor vehicle.

Preferably, ECU 100 includes provisions to communicate with additional systems of a motor vehicle. In some cases, ECU 100 can include a number of ECU connecting ports that facilitate the input and output of information and power. The term "ECU connecting port" as used throughout the specification and claims refers to an interface or shared boundary between two conductors. Examples of ECU connecting ports include but are not limited to mechanical connectors. In some cases, the ECU connecting ports could be male connectors. In other cases, the ECU connecting ports could be female connectors. In a preferred embodiment, ECU 100 can include a plurality of ECU connecting ports to facilitate communication with additional systems of the motor vehicle.

Referring to FIG. 2, ECU 100 includes first ECU connecting port 101, second ECU connecting port 102 and third ECU connecting port 133. First ECU connecting port 101, second ECU connecting port 102 and third ECU connecting port 133 are disposed on first side 181. In particular, first ECU connecting port 101, second ECU connecting port 102 and third ECU connecting port 133 extend outward from first side 181. With this arrangement, ECU 100 can communicate with other systems associated with a motor vehicle via first ECU connecting port 101, second ECU connecting port 102 and third ECU connecting port 133.

In some cases, wires or other types of connectors known in the art can be attached to first ECU connecting port 101, second ECU connecting port 102 and third ECU connecting port 133 or any combination of ECU connecting ports to facilitate communication with other systems of a motor vehicle. In this embodiment, first ECU connecting port 101 and second ECU connecting port 102 are attached to first connector 131 and second connector 132, respectively. First connector 131 may include a connecting port configured to engage first ECU connecting port 101. Furthermore, first connector 131 may be associated with one or more wires that are disposed within first harness 161. Preferably, the wires of first harness 161 are further connected to additional components or systems of the motor vehicle. With this arrangement, an electrical connection may be established between ECU 100 and other systems or components of the motor vehicle via the wires disposed in first harness 161.

Similarly, second connector 132 may include a connecting port configured to engage second ECU connecting port 102. Furthermore, second connector 132 may be associated with one or more wires that are disposed within second harness 162. Preferably, the wires of second harness 162 are further connected to additional components or systems of the motor vehicle. With this arrangement, an electrical connection may be established between ECU 100 and other systems or components of the motor vehicle via the wires disposed in second harness 162.

Preferably, a connector can include provisions to facilitate connection with an ECU connecting port. In some embodiments, a connector may include one or more tabs that assist in securing the connector to an ECU connecting port. In a preferred embodiment, a connector can include a connector lever that can be manipulated to secure and remove the connector from an ECU connecting port.

In this preferred embodiment, first connector 131 and second connector 132 are associated with first connector lever 141 and second connector lever 142, respectively. In particular, first connector 131 can be attached and removed from first ECU connecting port 101 by manipulating first connector lever 141. In some cases, first connector lever 141 may be raised up to allow first connector 131 to be disconnected from first ECU connecting port 101. Also, first connector lever 142 can be lowered to fully engage first connector 131 with first ECU connecting port 101. Likewise, second connector 132 can be attached and removed from second ECU connecting port 102 by manipulating second connector lever 142. In some cases, second connector lever 142 may be raised up to allow second connector 132 to be disconnected from second ECU connecting port 102. Also, second connector lever 142 can be lowered to fully engage second connector 132 with second ECU connecting port 102. Using connector levers may facilitate a strong mechanical connection between the ECU connecting ports and the corresponding connectors.

Typically, a motor vehicle includes provisions to prevent theft of the motor vehicle. In some cases, an electronic control unit can be configured to prevent the motor vehicle from starting without a correct ignition key. For example, the electronic control unit can include an electronic engine immobilizer. Using this arrangement, the electronic control unit must receive a valid signal from a microcircuit embedded in an ignition key to initiate a fuel-injection sequence that starts the motor vehicle. In other cases, a motor vehicle may include other provisions to prevent theft of the motor vehicle.

In some cases, a thief may attempt to bypass the security system by replacing components of the security system with substitute components. The substitute components may include, for example, a substitute ECU, a substitute key with a valid signal, and a substitute electronic engine immobilizer. Using this arrangement, a thief can connect the substitute components to systems of the motor vehicle in order to bypass the security system, which may allow them to steal the motor vehicle.

In order to bypass vehicle anti-theft systems, a thief may need to disconnect one or more connectors from the ECU connecting ports. Once the connectors have been disconnected, the thief may reconnect the connectors with a substitute ECU to bypass the anti-theft system. Preferably, an ECU is configured with provisions to deter a thief from acquiring access to connectors attached to ECU connecting ports. In some embodiments, an ECU can be surrounded by a chassis that limits the removal of connectors from the ECU. However, the chassis can be cumbersome to remove for maintenance and also negatively impacts the weight of a motor vehicle. In a preferred embodiment, an ECU can be configured with a theft deterrent system that prevents substantially immediate removal of any connectors attached to ECU connecting ports.

Referring to FIG. 2, ECU 100 preferably includes theft deterrent system 190. In some embodiments, theft deterrent system 190 may include shield portion 150 that is configured to cover a portion of first connector 131 and second connector 132 to prevent substantially immediate removal of first connector 131 and second connector 132 from first ECU connecting port 101 and second ECU connecting port 102, respectively. In this embodiment, shield portion 150 covers first connector lever 141 and second connector lever 142 to prevent the removal of first connector 131 and second connector 132, respectively. In other embodiments, however, shield portion 150 may cover another portion of first connector 131 and second connector 132 to prevent the removal of first connector 131 and second connector 132. Using this arrangement, shield portion 150 must be removed before first connector 131 and second connector 132 can be disconnected from first ECU connecting port 101 and second ECU connecting port 102.

Generally, shield portion 150 can have any shape configured to prevent the removal of one or more connectors that may be attached to ECU 100. In some embodiments, shield portion 150 could be configured to prevent the removal of a single connector. In other embodiments, shield portion 150 can be configured to prevent the removal of two connectors. In still other embodiments, shield portion 150 can be configured to prevent the removal of three or more connectors. In this preferred embodiment, shield portion 150 is configured with first portion 157 that covers a portion of first connector lever 141 and second connector lever 142, as illustrated in FIG. 1. Using this arrangement, shield portion 150 prevents the manipulation of first connector lever 141 and second connector lever 142 to prevent substantially immediate removal of first connector 131 and second connector 132.

In some embodiments, first portion 157 includes plurality of holes 158. Generally, plurality of holes 158 may include any number of holes. Also, plurality of holes 158 could be configured in any arrangement on first portion 157. In this embodiment, plurality of holes 158 is disposed at regular intervals on the length of first portion 157. Preferably, plurality of holes 158 may help decrease the weight of shield portion 150.

In a preferred embodiment, shield portion 150 also includes fastening portion 155. Generally, fastening portion 155 may be disposed in any location on shield portion 150. In some cases, fastening portion 155 may be associated with a tab that extends outwards from first portion 157. In other cases, fastening portion 155 could be disposed on first portion 157. In this preferred embodiment, fastening portion 155 is disposed at an approximately right angle to first portion 157, as illustrated in FIG. 2.

Referring to FIG. 2, shield portion 150 also comprises second portion 156. In this preferred embodiment, second portion 156 is disposed proximate to first portion 157 of shield portion 150. Furthermore, second portion 156 and first portion 157 are disposed at an obtuse angle with respect to each other. In addition, second portion 156 can have a generally convex shape. This preferred shape allows second portion 156 to follow a contour of a portion of first connector 131 and second connector 132. With this arrangement, second portion 156 may conform generally to a portion of first connector 131 and second connector 132, as illustrated in FIG. 1.

In a preferred embodiment, shield portion 150 also includes guide wall 159. Guide wall 159 is disposed proximate to second portion 156 opposite first portion 157. Referring to FIG. 2, guide wall 159 extends at an approximate right angle from second portion 156. In other embodiments, guide wall 159 may extend at an angle other than an approximately right angle from second portion 156.

Generally, guide wall 159 can be constructed with any shape. In some embodiments, guide wall 159 may be configured with a generally flat shape. Furthermore, guide wall 159 may have a greater length than width. In some cases, guide wall 159 may not extend the full length of second portion 156. In other cases, guide wall 159 may extend the entire length of second portion 156.

Generally, shield portion 150 can be fastened to any portion of ECU 100. In some embodiments, shield portion 150 may be secured to a chassis of ECU 100 directly. In a preferred embodiment, shield portion 150 is fastened to bracket portion 110 of ECU 100.

In different embodiments, the number of fasteners used to secure shield portion 150 to bracket portion 110 can vary. In some embodiments, a single fastener can be used. In other embodiments, two or more fasteners can be used. In some cases, using multiple fasteners may increase the time required by a thief to remove shield 150 and thereby gain access to one or more connectors.

Referring to FIG. 2, shield portion 150 can be fastened to bracket portion 110 with fastener 160. Generally, fastener 160 may be any type of fastener. In this preferred embodiment, fastener 160 is a mounting bolt that can be fastened and unfastened by a socket wrench, hex wrench or similar tool. In this embodiment, intermediate portion 113 of bracket portion 110 includes first fastener receiving portion 111 configured to receive fastener 160. Similarly, shield portion 150 includes second fastener receiving portion 152 disposed on fastening portion 155. Second fastener receiving portion 152 is also configured to receive fastener 160. With this configuration, fastener 160 can engage second fastener receiving portion 152 and first fastener receiving portion 111 to fasten shield portion 150 to bracket portion 110.

Following the attachment of shield portion 150 to bracket portion 110, first portion 112 of bracket portion 110 can be attached to brace 120 as illustrated in FIG. 1. Alternatively, in some cases, first portion 112 of bracket portion 110 may first be fastened to brace 120 before bracket portion 110 is fastened to shield portion 150. Preferably, this fastening arrangement of shield portion 150 to bracket portion 110 helps prevent substantially immediate removal of first connector 131 and second connector 132.

Figure 3:
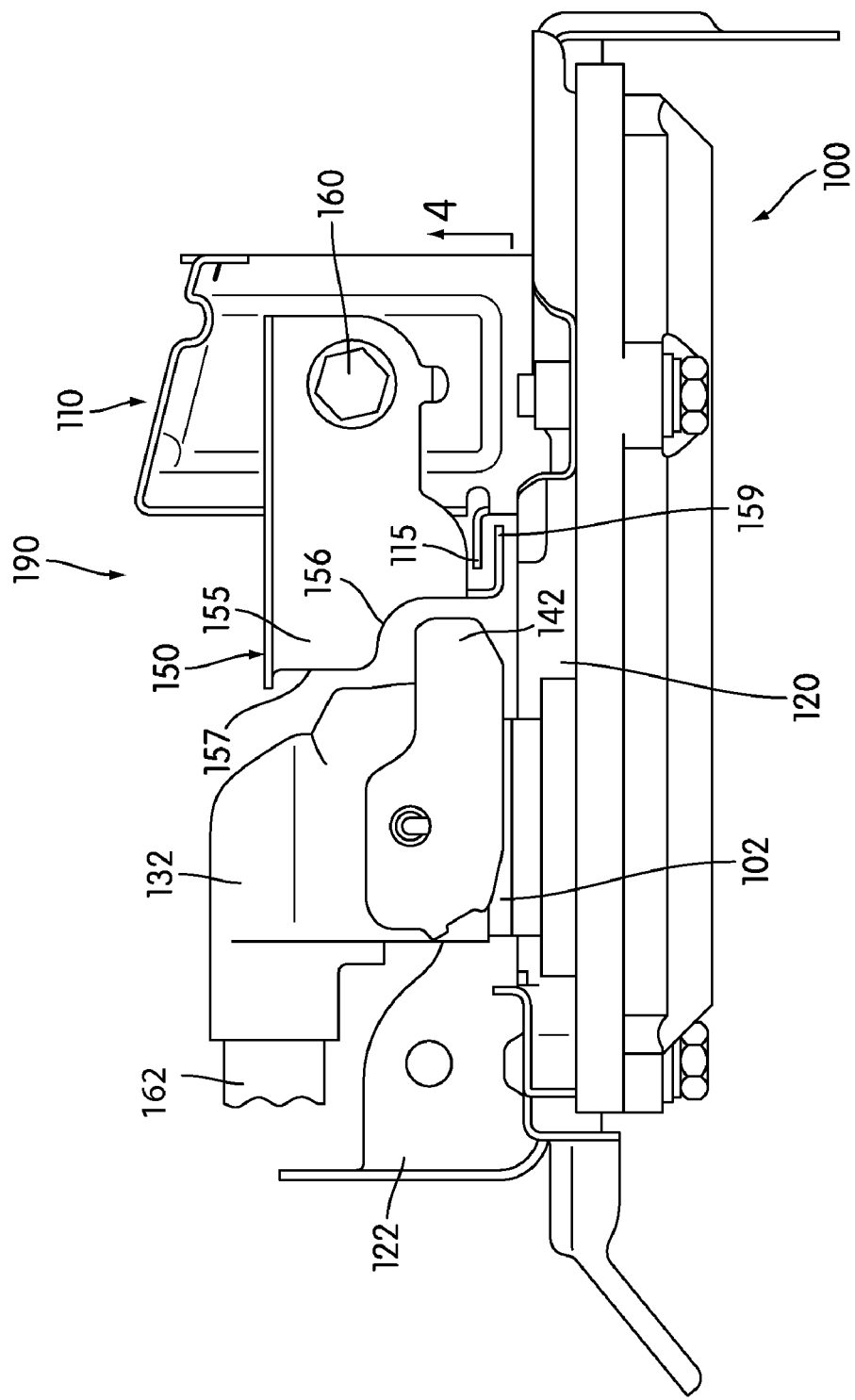
FIG. 3 is a top view of a preferred embodiment of an electronic control unit with a theft deterrent system.

Referring to FIG. 3, a top view of a preferred embodiment of ECU 100, shield portion 150 may be shaped to prevent first connector 131, not visible in this Figure, and second connector 132 from being removed prior to removing shield portion 150. As seen in FIG. 3, first portion 157 of shield portion 150 is disposed adjacent to second connector lever 142 of second connector 132. Although not visible in FIG. 3, it should be understood that first portion 157 is also disposed adjacent to first connector lever 141 of first connector 131. Using this arrangement, first portion 157 prevents the movement of second connector lever 142 and first connector lever 141 with shield portion 150 in a fully fastened position.

In some embodiments, bracket portion 110 may include provisions for guiding the movement of shield portion 150. In particular, bracket portion 110 may be configured to move in a longitudinal direction. The term "longitudinal direction" as used throughout this detailed description and the claims refers to a direction that is substantially parallel with a length of shield portion 150. In some embodiments, bracket portion 110 may include provisions to help facilitate the movement of shield portion 150 in the longitudinal direction. Furthermore, in some embodiments, bracket portion 110 may include provisions to help prevent unwanted movement of shield portion 150 in directions other than the longitudinal direction.

Figure 4:
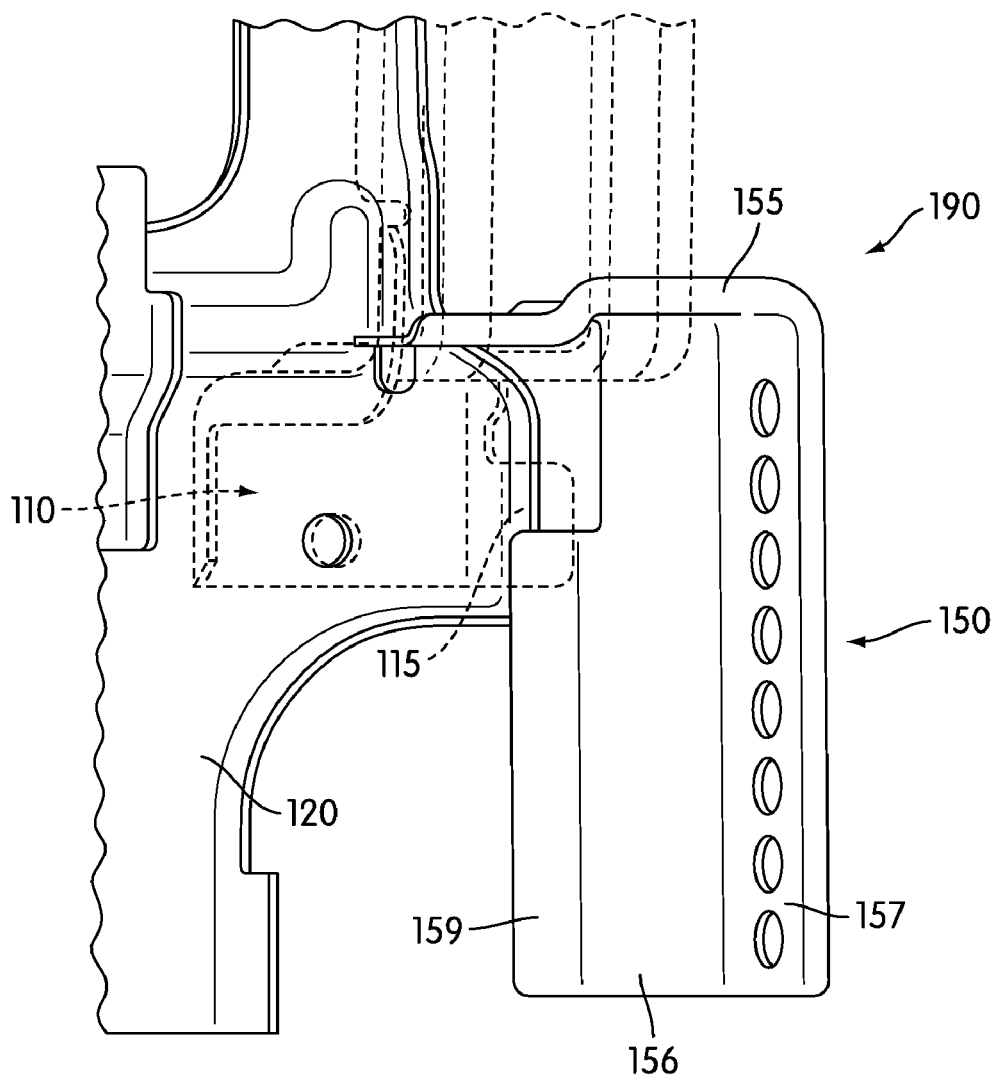
FIG. 4 is an enlarged view of a preferred embodiment of a theft deterrent system.

Referring to FIGS. 3 and 4, bracket portion 110 includes guide tab 115 to help facilitate the movement of shield portion 150 in a longitudinal direction. Generally, guide tab 115 can be configured in any manner and with any shape. In this embodiment, guide tab 115 protrudes outward from bracket portion 110. In addition, guide tab 115 comprises a generally rectangular shape.

As previously discussed, shield portion 150 includes guide wall 159. Preferably, shield portion 150 is fastened in a manner so that guide wall 159 of shield portion 150 is disposed between guide tab 115 of bracket portion 110 and brace 120. This configuration allows guide wall 159 to be constrained between guide tab 115 and brace 120. In other embodiments that do not include brace 120, guide wall 159 may be disposed between guide tab 115 and ECU 100. Preferably, guide wall 159 prevents the rotation of shield portion 150 about a generally longitudinal direction prior to the removal of shield portion 150.

Generally, any portion of guide wall 159 can be disposed between guide tab 115 of bracket portion 110 and brace 120. In some embodiments, guide tab 115 and guide wall 159 may be configured so that the entirety of guide wall 159 is disposed between guide tab 115 and brace 120. In a preferred embodiment, only a portion of guide wall 159 may be disposed between guide tab 115 and brace 120 to require the complete unfastening of fastener 160 in order to remove shield portion 150.

In this preferred embodiment, guide wall 159 extends over a substantial majority of the length of shield portion 150. This arrangement allows guide wall 159 to guide the motion of shield portion 150 over a substantial length of shield portion 150. In other words, unfastening shield portion 150 in a substantially longitudinal direction requires sliding the entire length of guide wall 159 through guide tab 115 and brace 120. With this configuration, guide wall 159 continues to prevent the rotation of shield portion 150 about a generally longitudinal direction until fastener 160 has been unfastened and withdrawn from bracket portion 110. This arrangement requires fully unfastening fastener 160 from shield portion 150 and bracket portion 110 to gain access to first connector 131 and second connector 132. Preferably, this arrangement increases the time required to remove shield portion 150.

Generally, a guide wall and one or more fasteners can be configured with any lengths to increase the time required to remove a shield portion and access one or more connectors that are attached to an electronic device. In some embodiments, the lengths of the guide wall and fasteners can be different. In a preferred embodiment, the lengths of the guide wall and the fasteners are substantially similar.

Figure 5:
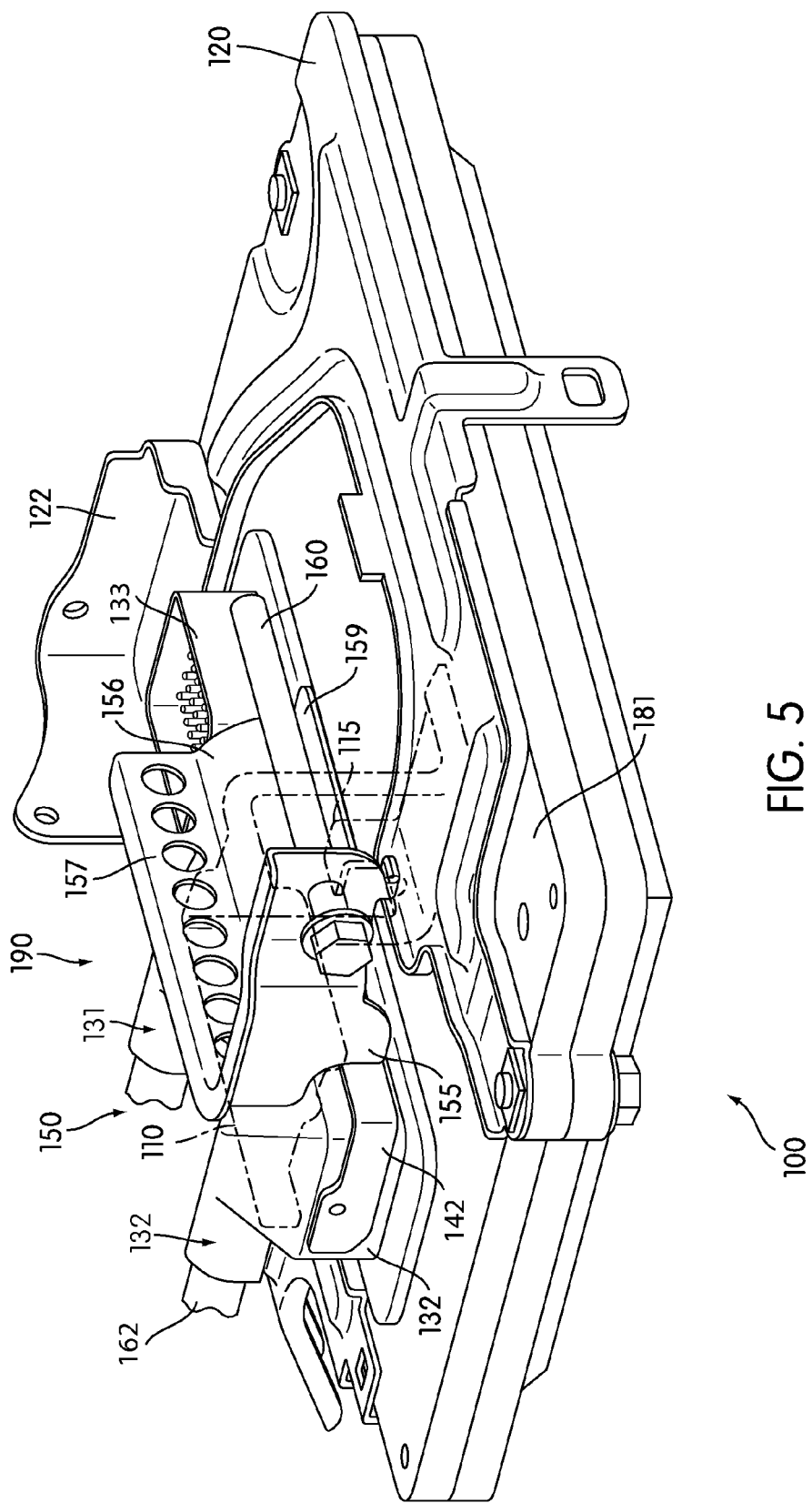
FIG. 5 is an isometric view of a preferred embodiment of an electronic control unit with a theft deterrent system.

Referring to FIGS. 2 and 5, fastener 160 is configured with first length L1. Also, guide wall 159 comprises second length L2. In this preferred embodiment, second length L2 is substantially similar to first length L1. With this arrangement, the entire first length L1 of fastener 160 must be completely removed from bracket portion 110, shown here in phantom, before second length L2 of guide wall 159 is free of guide tab 115. In other words, guide tab 115 continues to constrain guide wall 159 as shield portion 150 is unfastened from bracket portion 110. If guide wall 159 had a length less than first length L1 of fastener 160, then guide wall 159 could be free of guide tab 115 before the full first length L1 of fastener 160 is removed from bracket portion 110 and shield portion 150. With this configuration of substantially equal lengths of guide wall 159 and fastener 160, the time required to remove shield portion 150 may be proportional to first length L1 and second length L2.

Figure 6:
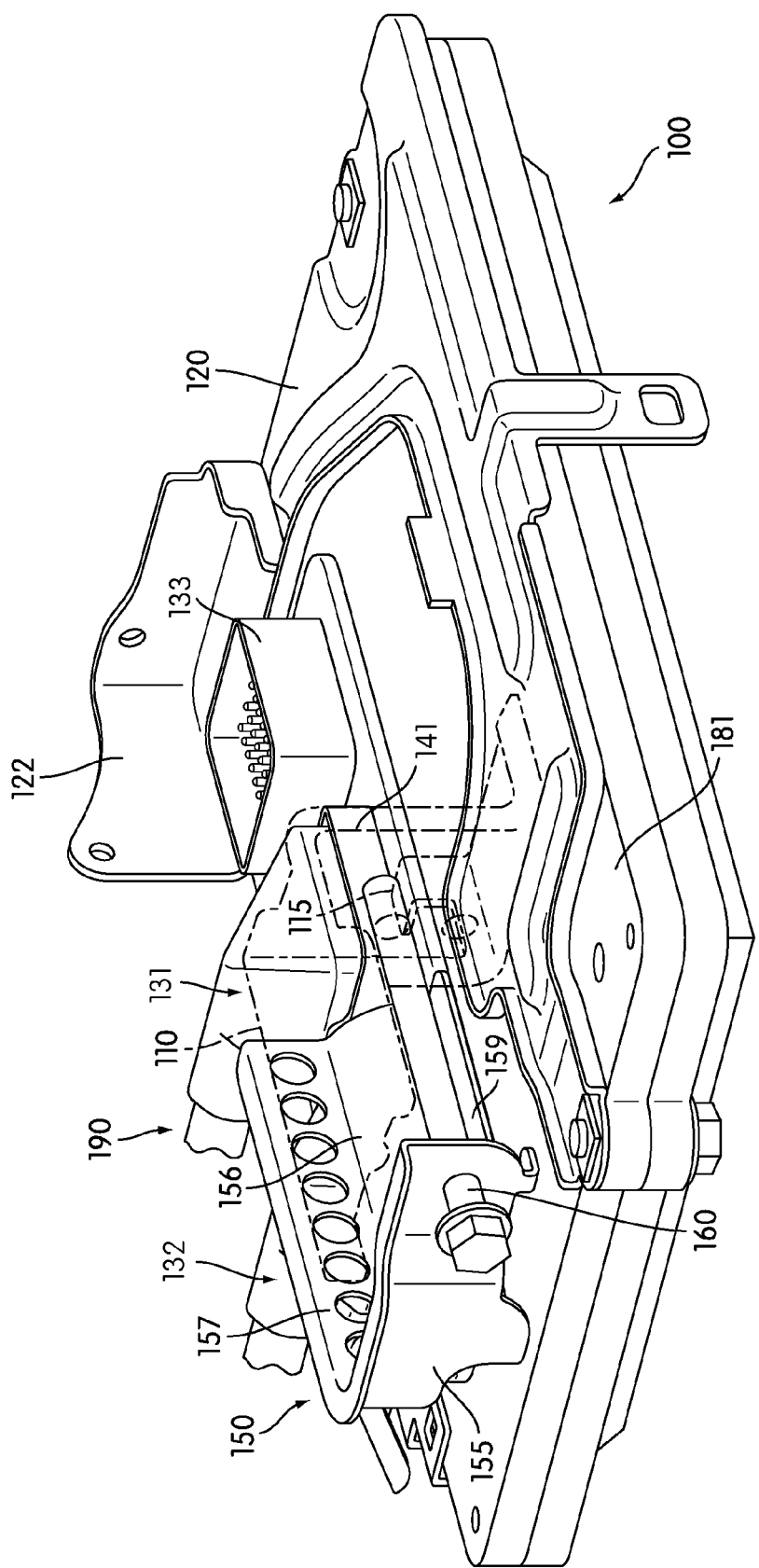
FIG. 6 is an isometric view of an exemplary embodiment of an incomplete removal of a theft deterrent system from an electronic control unit.
Figure 7:
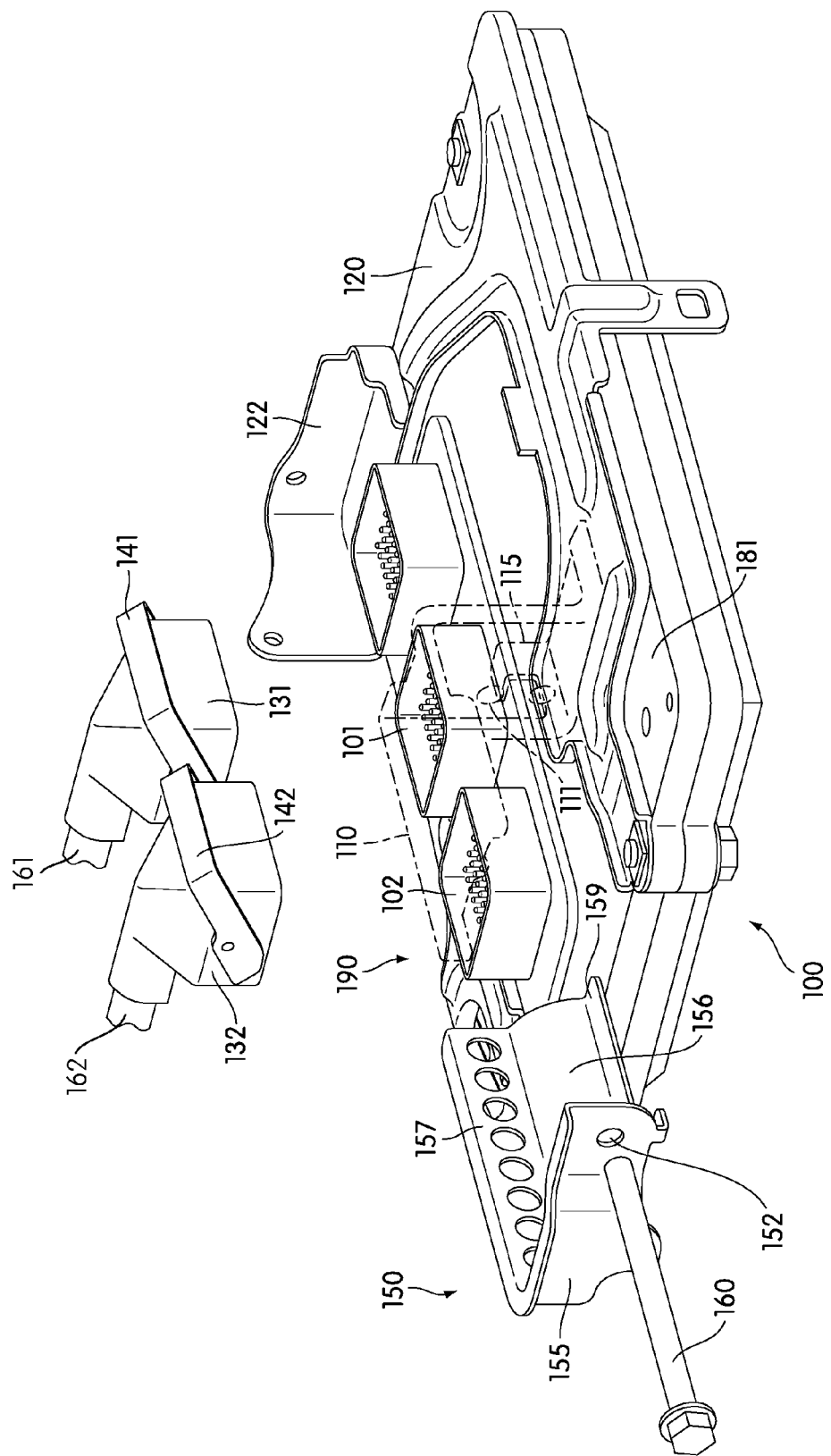
FIG. 7 is an isometric view of an exemplary embodiment of a removal of a theft deterrent system from an electronic control unit.

FIGS. 6-7 illustrate an exemplary embodiment of the removal of shield portion 150 to gain access to first connector 131 and second connector 132. For illustrative purposes, bracket portion 110 is illustrated in phantom in these Figures. It should be understood that this embodiment is intended to be exemplary. In other embodiments, shield portion 150 may be removed in another manner.

Referring to FIG. 6, fastener 160 is partially unfastened from bracket portion 110 and shield portion 150. As fastener 160 is withdrawn from bracket portion 110, shield portion 150 has some restricted movement. In particular, shield portion 150 can move in a generally longitudinal direction a length substantially equal to the length that fastener 160 is removed from bracket portion 110.

Before fastener 160 is completely disengaged from first fastener receiving portion 111 of bracket portion 110, a thief could attempt to rotate shield portion 150 so that is not blocking first connector lever 141 and second connector lever 142 in an attempt to access first connector 131 and second connector 132. However, with shield portion 150 only partially unfastened, guide wall 159 continues to be constrained by guide tab 115 (see FIG. 4). With this arrangement, guide wall 159 impedes the rotation of shield portion 150 until fastener 160 is completely removed from bracket portion 110. This configuration prevents access to first connector lever 141 and second connector lever 142 until fastener 160 is completely removed from bracket portion 110.

Referring to FIG. 7, fastener 160 is completely unfastened from bracket portion 110 and shield portion 150. With the unscrewing of fastener 160, shield portion 150 can be disengaged from bracket portion 110 by sliding the entire length of guide wall 159 between guide tab 115 and brace 120 until guide wall 159 is no longer impeded by guide tab 115. By removing shield portion 150, access to first connector lever 141 and second connector lever 142 is gained. At this point, first connector 131 and second connector 132 may be removed from first ECU connecting port 101 and second ECU connecting port 102, respectively. In some cases, first connector lever 141 and second connector lever 142 may be raised in order to remove first connector 131 and second connector 132, respectively. The removal of first connector 131 and second connector 132 may allow a thief to connect first connector 131 and second connector 132 to a substitute ECU in order to steal a motor vehicle.

With this configuration of theft deterrent system 190, substantially immediate removal of first connector 131 and second connector 132 is prevented. Furthermore, access to first connector 131 and second connector 132 can only be obtained by completely unfastening fastener 160 from bracket portion 110 and shield portion 150. In other embodiments, theft deterrent system 190 can include additional fasteners that must be unfastened before access is gained to connectors of ECU 100. By making the removal of fastener 160 a time consuming process, theft deterrent system 190 can prevent substantially immediate access to connectors attached to ECU 100 and thereby potentially deter a theft of a motor vehicle.

Although the current embodiment of a theft deterrent system is configured to be used with connectors including connector levers, in other embodiments, the theft deterrent system could be applied to connectors without levers. In embodiments with other types of connectors not including levers, a shield portion could be disposed adjacent to a back or top side of one or more connectors. This arrangement could preferably help block the rearward travel path of one or more connectors to help prevent substantially immediate removal of the one or more connectors.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A motor vehicle, comprising:
an ECU including an ECU connecting port;
a connector configured to connect with the ECU connecting port, the connector providing access to one or more electrical systems of the motor vehicle;
a bracket portion attached to the ECU including a first fastener receiving portion;
a shield portion including a second fastener receiving portion; a fastener configured to engage the first fastener receiving portion and the second fastener receiving portion and thereby attach the shield portion to the bracket portion; wherein the shield portion is configured to cover a portion of the connector to prevent substantially immediate removal of the connector from the ECU connecting port; wherein the ECU includes a plurality of ECU connecting ports corresponding with a plurality of connectors; wherein the shield portion is configured to cover a portion of the plurality of connectors.

2. The motor vehicle according to claim 1, wherein the ECU is associated with a brace.

3. The motor vehicle according to claim 1, wherein each of the plurality of connectors includes a connector lever that is raised to allow the each connector to be removed from its corresponding ECU connecting port, and wherein the shield portion is disposed adjacent to each connector lever and prevents removal of the each connector when the shield portion is in a fastened position.

4. The motor vehicle according to claim 1, wherein the fastener is a bolt.

5. The motor vehicle according to claim 4, wherein the shield portion can be moved by unscrewing the bolt to allow access to the connector.

6. The motor vehicle according to claim 5, wherein the bolt has a first length that is substantially similar to a second length of a guide wall of the shield portion.

7. The motor vehicle according to claim 6, wherein the shield portion is attached to the bracket portion using at least two fasteners.

8. A motor vehicle, comprising:
an ECU including an ECU connecting port;
a connector configured to connect with the ECU connecting port, the connector providing access to one or more electrical systems of the motor vehicle;

a bracket portion attached to the ECU including a first fastener receiving portion;

a shield portion including a second fastener receiving portion;

a fastener configured to engage with the first fastener receiving portion and the second fastener receiving portion and thereby attach the shield portion to the bracket portion; the shield portion further including a guide wall; the bracket portion further including a guide tab; the shield portion being configured cover a portion of the connector to prevent substantially immediate removal of the connector from the ECU connecting port; wherein the shield portion is configured to move in a first direction that is substantially parallel with the length of the shield portion and wherein the guide wall is configured to substantially prevent rotation of the shield portion about the first direction; wherein the ECU is associated with a brace; and wherein the connector includes a connector lever.

9. The motor vehicle according to claim 8, wherein the fastener is a bolt.

10. The motor vehicle according to claim 9, wherein the guide wall has a second length that is substantially similar to a first length of the bolt.

11. The motor vehicle according to claim 8, wherein the fastener is completely unfastened to remove the shield portion.

12. The motor vehicle according to claim 8, wherein the guide wall extends over a majority of the length of the shield portion.

13. The motor vehicle according to claim 8, wherein the ECU includes a plurality of ECU connecting ports corresponding with a plurality of connectors.

14. The motor vehicle according to claim 8, wherein the guide wall is disposed between the brace and the guide tab.

15. The motor vehicle according to claim 13, wherein the shield portion is configured to cover a portion of the plurality of connectors.

16. The motor vehicle according to claim 8, wherein the connector lever is raised to allow the connector to be removed from the ECU connecting port.

17. The motor vehicle according to claim 16, wherein a first portion of the shield portion is disposed adjacent to the connector lever and prevents removal of the connector when the shield portion is in a fastened position.

18. A method of preventing substantially immediate removal of a plurality of connectors connected to a corresponding plurality of ECU connecting ports of an ECU of a motor vehicle, the plurality of connectors providing access to one or more electrical systems of the motor vehicle, the method comprising:

associating a shield portion with a bracket portion of the ECU, wherein the bracket portion is attached to the ECU and includes a first fastener receiving portion and wherein the shield portion includes a second fastener receiving portion;

aligning the shield portion to cover a portion of the plurality of connectors to prevent substantially immediate removal of the plurality of connectors from the plurality of ECU connecting ports;

fastening the shield portion to the bracket portion with a fastener that engages the first fastener receiving portion and the second fastener receiving portion; and thereby increasing the time required to remove the plurality of connectors from the plurality of ECU connecting ports.

19. The method according to claim 18, wherein fastening the shield portion to the bracket portion includes screwing a bolt through the bracket portion and the shield portion.

20. The method according to claim 18, wherein aligning the shield portion includes associating a guide wall of the shield portion with a guide tab of the bracket portion.

* * * * *